US009072968B2

(12) United States Patent
Sakai et al.

(10) Patent No.: US 9,072,968 B2
(45) Date of Patent: Jul. 7, 2015

(54) GAME DEVICE, GAME CONTROL METHOD, AND GAME CONTROL PROGRAM FOR CONTROLLING GAME ON THE BASIS OF A POSITION INPUT RECEIVED VIA TOUCH PANEL

(75) Inventors: Kenji Sakai, Tokyo (JP); Eiji Yamada, Tokyo (JP); Katsuyuki Kanetaka, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 308 days.

(21) Appl. No.: 13/602,767

(22) Filed: Sep. 4, 2012

(65) Prior Publication Data

US 2013/0065687 A1 Mar. 14, 2013

(30) Foreign Application Priority Data

Sep. 9, 2011 (JP) .................................. 2011-197628

(51) Int. Cl.
| A63F 9/24 | (2006.01) |
| A63F 13/00 | (2014.01) |
| G06F 17/00 | (2006.01) |
| G06F 19/00 | (2011.01) |
| A63F 13/20 | (2014.01) |
| A63F 13/40 | (2014.01) |

(52) U.S. Cl.
CPC ................ *A63F 13/06* (2013.01); *A63F 13/10* (2013.01); *A63F 2300/1075* (2013.01)

(58) Field of Classification Search
USPC ........ 463/7, 20, 25, 36, 37, 38; 345/156, 157, 345/158, 520, 522
See application file for complete search history.

(56) References Cited

U.S. PATENT DOCUMENTS

| 8,345,001 B2 | 1/2013 | Yamamoto |
| 2006/0025218 A1 | 2/2006 | Hotta |
| 2009/0174652 A1* | 7/2009 | Yamamoto et al. ........... 345/156 |
| 2009/0213081 A1 | 8/2009 | Case, Jr. |
| 2010/0197375 A1* | 8/2010 | Nagaoka .......................... 463/9 |

FOREIGN PATENT DOCUMENTS

| JP | 2010233957 A | 10/2010 |
| WO | 2005065798 A1 | 7/2005 |

OTHER PUBLICATIONS

European Search Report for corresponding EP Application No. EP12005932, dated Nov. 28, 2013.
Office Action issued for corresponding Japanese Patent Application No. 2011-197628, dated Jun. 18, 2013.
Poka Sca Ghost!, Monthly Arcadia, October Issue, [No. 089], Enterbrain, INC., vol. 8, No. 10 (89th volume in total), 9 pages Oct. 1, 2007 (for relevancy, see Japanese Patent Application No. 2011-197628, dated Jun. 18, 2013).

* cited by examiner

*Primary Examiner* — Adetokunbo O Torimiro
(74) *Attorney, Agent, or Firm* — Matthew B. Dernier, Esq.; Gibson & Dernier LLP (57) ABSTRACT

A game device includes an input position acquiring unit and a first game control unit. The input position acquiring unit acquires a position of an entry provided by a player to a touch panel, which can concurrently detect entries at multiple points. The first game control unit displays objects and a sequence in which the objects should be erased on a screen image, and, in case that a position of an entry acquired is at a position corresponding to a position where an object to be erased next is displayed, erases the object from the screen image. The first game control unit includes: a single tap input control unit that, when an input on one object is acknowledged, erases the object; and a multiple-graphic-symbol-tap input control unit that, when inputs on multiple objects are acknowledged concurrently, erases those objects.

12 Claims, 10 Drawing Sheets

| SEQUENCE | POSITION | RADIUS | NUMBER | REMAINING NUMBER |
|---|---|---|---|---|
| 1 | (30, 40) | 30 | 1 | 1 |
| 2 | (135, 60) | 15 | 1 | 1 |
| 3 | (85, 30) | 25 | 2 | 2 |
| 4 | (75, 70) | 20 | 1 | 1 |
| 4 | (130, 15) | 20 | 1 | 1 |

| SEQUENCE | AREA | HEIGHT | FLAG |
|---|---|---|---|
| 1 | 0 | 27.5 | 1 |
| 2 | 1 | 32.5 | 1 |
| 3 | 0 | 50 | 1 |
| 4 | 1 | 55 | 1 |
| 4 | 0 | 60 | 1 |

GAME DEVICE, GAME CONTROL METHOD, AND GAME CONTROL PROGRAM FOR CONTROLLING GAME ON THE BASIS OF A POSITION INPUT RECEIVED VIA TOUCH PANEL

BACKGROUND OF THE INVENTION

1. Field of the Invention

The present invention generally relates to game control technology, and more particularly, to a game device, a game control method, and a game control program that receives a position input by a touch panel or the like and controls a game on the basis of the received position input.

2. Description of the Related Art

Information terminals and game devices provided with a touch panel have become popular. Games that take advantage of the characteristics of touch panels, with which players can directly touch a game screen image displayed on a display device, have also been provided.

The present applicant has been developed portable game terminals comprising a touch panel that allows inputs at a plurality of points, a rear touch panel provided on the back surface of the game terminal, or the like. The present inventor has attained an idea on a new technology for controlling a game that takes advantage of the characteristics of such new portable game terminals.

SUMMARY OF THE INVENTION

In this background, a purpose of the present invention is to provide a technology for controlling a game having a higher enjoyment level.

According to an aspect of the present invention, a game control program is provided. The game control program allows a computer to function as a game control unit. The game control unit displays a plurality of objects and a sequence in which the objects should be erased on a screen image of a display device, and, in case that a position of an input (entry) provided by a player to an input device, which is provided on a screen of the display device and can concurrently detect inputs at a plurality of points, is at a position corresponding to a position where an object to be erased next is displayed, erases the object from the screen image. The game control unit includes: a first control unit that, when an input on one object is acknowledged, erases the object; and a second control unit that, when inputs on a plurality of objects are acknowledged concurrently, erases those objects.

According to another aspect of the present invention, also a game control program is provided. The game control program allows a computer to function as a game control unit. The game control unit controls a game that displays a plurality of first objects and a sequence in which the first objects should be erased on a screen image of a display device, and erases the plurality of first objects from the screen image. The game control unit includes: a movement control unit that moves a second object on the screen image in accordance with a position and a strength of an input provided by a player to an input device, which is provided on a screen of the display device and can detect a position and a strength of an input; an erase control unit that erases a first object to be erased next if the second object contacts the first object; and a collision control unit that controls the second object so that if the second object contacts a first object that should not be erased next, the second object stops for a predetermined time period without moving or collides with the first object and bounces back.

Optional combinations of the aforementioned constituting elements, and implementations of the invention in the form of methods, apparatuses, systems, or the like may also be practiced as additional modes of the present invention.

DETAILED DESCRIPTION OF THE INVENTION

The invention will now be described by reference to the preferred embodiments. This does not intend to limit the scope of the present invention, but to exemplify the invention.

A game device according to an exemplary embodiment controls a game that sequentially erases a plurality of graphic symbols displayed on a display device by a tap input onto a touch panel.

Figure 1:
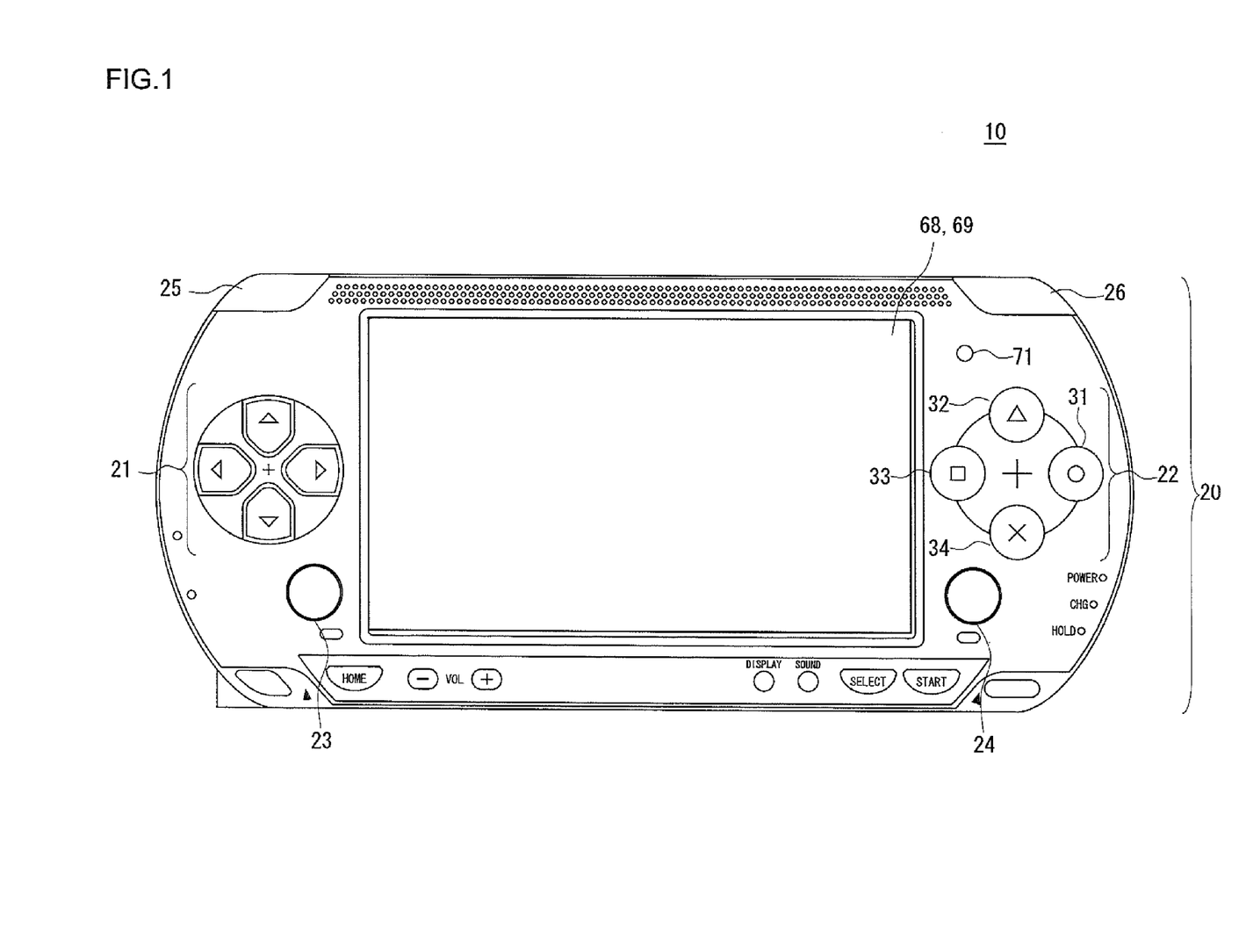
FIG. 1 shows an external view of a game device according to an exemplary embodiment.
Figure 2:
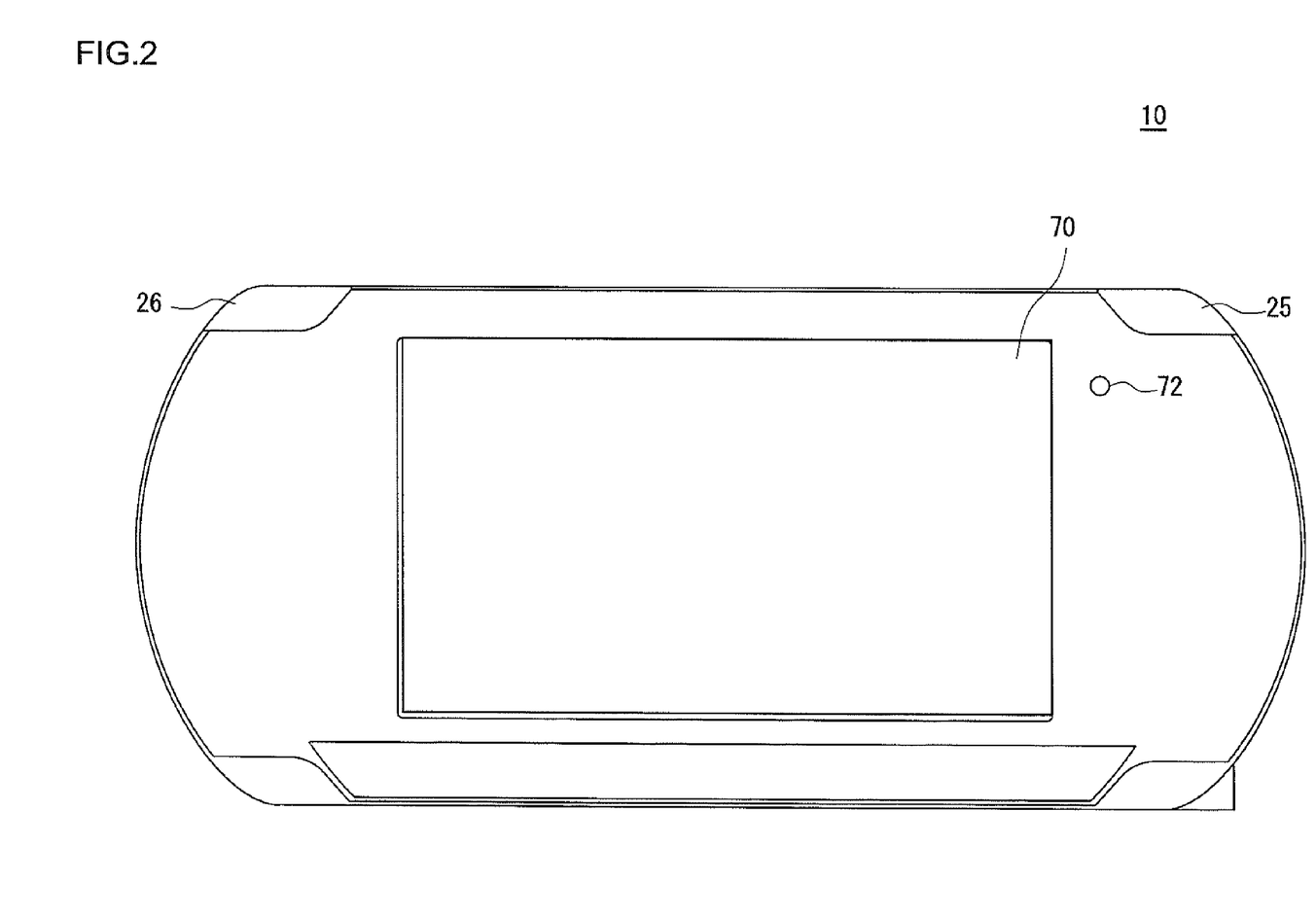
FIG. 2 shows an external view of the game device according to the exemplary embodiment.

FIGS. 1 and 2 show an external view of the game device 10 according to the exemplary embodiment. The game device 10 shown in FIGS. 1 and 2 are a portable game device that a player holds and uses. As shown in FIG. 1, on the front side of the game device 10 (i.e., the side facing to a player when the player holds and manipulates the game device 10), an input device 20 including directional keys 21, buttons 22, a left analogue stick 23, a right analogue stick 24, a left button 25, a right button 26, or the like, a display device 68, and a front camera 71 are provided. With the display device 68, a touch panel 69 for detecting contact made by a finger of the player, a stylus pen, or the like is provided. The buttons 22 include a circle button 31, a triangle button 32, a square button 33, and a cross button 34.

As shown in FIG. 2, on the backside of the game device 10, a rear touch panel 70 and a rear camera 72 are provided. Although a display device may be provided also on the backside of the game device 10 in a similar manner with that of the front side, a display device is not provided on the backside of the game device 10 and only the rear touch panel 70 is provided on the backside according to the exemplary embodiment.

A player can, for example, manipulate the buttons 22 with his/her right hand thumb, manipulate the directional keys 21 with his/her left hand thumb, manipulate the right button 26 with his/her right hand index finger or middle finger, manipulate the left button 25 with his/her left hand index finger or middle finger, manipulate the touch panel 69 with his/her thumbs of both hands, and manipulate the rear touch panel 70 with his/her ring fingers or pinky fingers of both hands while holding the game device 10 with his/her both hands. In case of using a stylus pen, or the like, for example, the player can manipulate the touch panel 69 and buttons 22 with the right hand using the stylus pen or using the index finger, manipulate the directional keys 21 with the left hand thumb, manipulate the left button 25 with the left hand index finger or middle finger, and manipulate the rear touch panel 70 with the left hand ring finger or the pinky finger while holding the game device 10 with the left hand.

Figure 3:
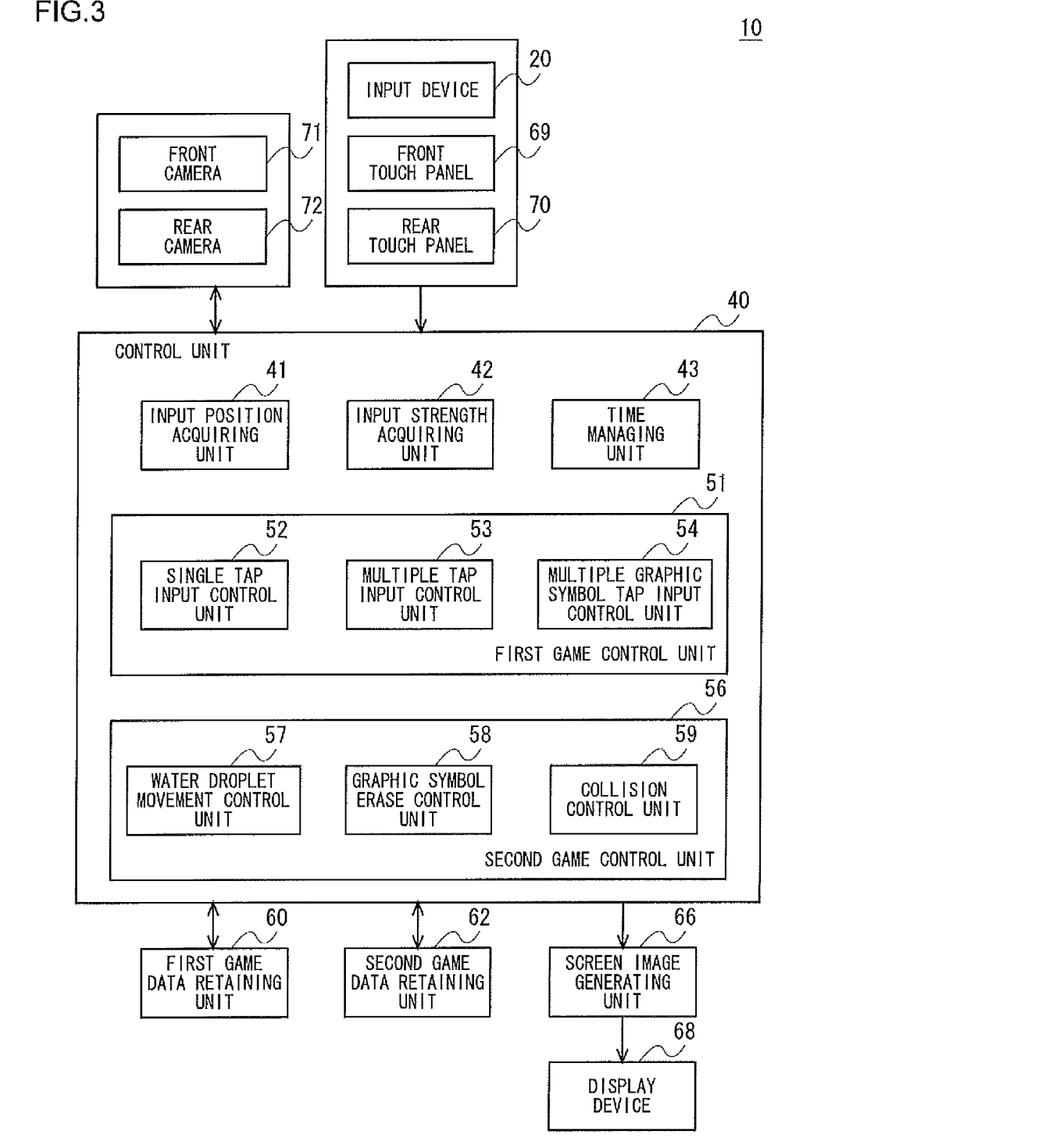
FIG. 3 shows a structure of the game device according to the exemplary embodiment.

FIG. 3 shows the structure of the game device 10 according to the exemplary embodiment. The game device 10 comprises the input device 20, an input receiving unit 30, a control unit 40, a first game data retaining unit 60, a second game data retaining unit 62, a screen image generating unit 66, the display device 68, the touch panel 69, the rear touch panel 70, the front camera 71, and the rear camera 72. Those elements are implemented by a CPU of a computer, memory, a program loaded into the memory, or the like in terms of hardware components. FIG. 3 depicts functional blocks implemented by cooperation of these components. Therefore, it will be obvious to those skilled in the art that the functional blocks may be implemented in a variety of ways, by hardware only, software only, or a combination thereof.

The touch panel 69 may be any types of touch panel, such as, matrix switch type, resistance film type, surface acoustic wave type, infrared type, electromagnetic induction type, electrical capacitance type, or the like. As will be described later, the touch panel 69 can concurrently detect inputs at a plurality of points in order to implement a first game. The touch panel 69 outputs coordinates of a position where an input is detected at predetermined time intervals.

The rear touch panel 70 may also be any types of touch panel. As will be described later, the rear touch panel 70 can detect the strength of an input in order to implement a second game. The rear touch panel 70 may comprise a pressure sensitive sensor that is capable to detect the pressure of a pressing force onto the rear touch panel 70. Alternatively, the rear touch panel 70 may calculate the strength of an input on the basis of an area where an input is detected, a voltage value, an electric capacitance, or the like. The rear touch panel 70 outputs coordinates of a position where an input is detected and the strength (pressure) of the input at predetermined time intervals.

The input receiving unit 30 receives control signals that are input from the input device 20 manipulated by a player. The control unit 40 reads out a program from a recording medium or the like that stores a program of a game, executes the program and makes the game progress on the basis of an operation received by the input receiving unit 30, the operation having been input by a player. The first game data retaining unit 60 retains information necessary for the progression of the first game. The second game data retaining unit 62 retains information necessary for the progression of the second game. The screen image generating unit 66 generates a screen image of a game that is controlled by the control unit 40 and allows the display device 68 to display the screen image. The front camera 71 takes an image of the front side of the game device 10. The rear camera 72 takes an image of the backside of the game device 10.

The control unit 40 includes an input position acquiring unit 41, an input strength acquiring unit 42, a time managing unit 43, a first game control unit 51, and a second game control unit 56. The first game control unit 51 includes a single tap input control unit 52, a multiple tap input control unit 53, and a multiple-graphic-symbol-tap input control unit 54. The second game control unit 56 includes a water droplet movement control unit 57, a graphic symbol erase control unit 58, and a collision control unit 59.

The input position acquiring unit 41 acquires the coordinates of the position of an input to the touch panel 69 and an input to the rear touch panel 70, the inputs being provided by a player. The input strength acquiring unit 42 acquires the strength of an input provided by a player to the rear touch panel 70. The input strength acquiring unit 42 may also acquire the strength of an input provided by a player to the touch panel 69. The position and the strength of an input provided by a player and detected by the touch panel 69 or the rear touch panel 70 may be calculated by a device driver or the like (not shown) provided in the touch panel 69 and the rear touch panel 70, or in the control unit 40. The input position acquiring unit 41 and the input strength acquiring unit 42 may acquire information on the position and the strength calculated by the device driver or the like.

The time managing unit 43 manages time elapsed from the start of a game during the first game or during the second game. As will be described later, the first game and the second game is a game in which players compete for time to erase all of a plurality of graphic symbols displayed on a screen image. The time managing unit 43 displays time elapsed from the start of a game while executing the first game and the second game. After the game is completed, the time managing unit 43 displays time elapsed from the start to the end of the game as the result of the game.

The first game control unit 51 controls the first game for allowing a player to experience a variety of tap inputs onto the touch panel 69. The first game is a game where a player taps in order of instruction a plurality of graphic symbols displayed on a screen image. A graphic symbol to be displayed on a screen image may be in any shapes, and may be an image of a rendered three-dimensional object, or the like.

Figure 4:
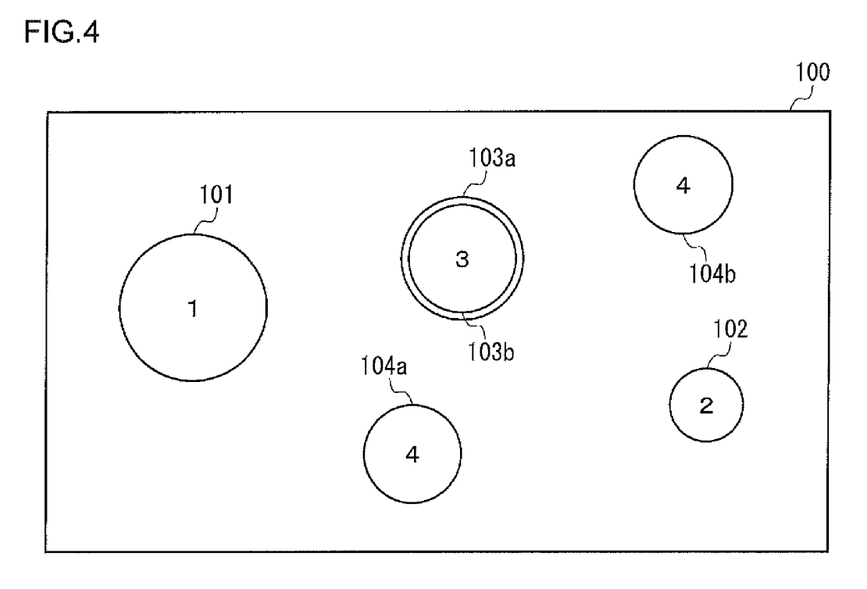
FIG. 4 shows an exemplary game screen image of a first game.

FIG. 4 shows an exemplary game screen image of the first game. A plurality of graphic symbols 101-104 to be tapped by a player are displayed on a screen image 100. The player taps the graphic symbols in order of numbers displayed inside the graphic symbols 101-104. In case that one graphic symbol is displayed for one number, for example in case of the graphic symbol 101 and the graphic symbol 102, one tap by the player erases the graphic symbol. In case that a plurality of graphic symbols are displayed for one number, for example in case of the graphic symbol 103a and the graphic symbol 103b, sequential taps on the graphic symbols in the number of displayed graphic symbols erase the graphic symbols. In case that a plurality of graphic symbols, on which a same referential number is marked, are displayed, for example in case of the graphic symbol 104a and the graphic symbol 104b, concurrent taps on the graphic symbols of which the same number is marked erase the graphic symbols. The player competes for time from the start of the game until all of the graphic symbols are erased.

Figure 5:
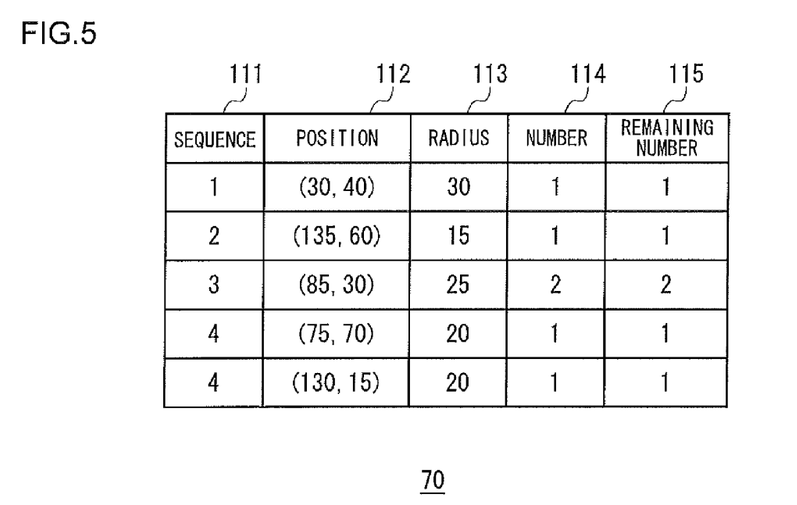
FIG. 5 shows an example of data stored in a first game data retaining unit.

FIG. 5 shows an example of data stored in the first game data retaining unit. In the first game data retaining unit 60, a sequence field 111, a position field 112, a radius field 113, a number field 114, and a remaining number field 115 are provided. In the sequence field 111, a sequence in which the graphic symbols should be tapped is stored. In the position field 112, coordinates indicating the position of graphic symbols are stored. In the radius field 113, the radii of graphic symbols are stored. According to the exemplary embodiment, since circles are displayed on the screen image as the graphic symbols, the coordinates of the centers of the circles and the radii of the circles are stored in the position field 112 and in the radius field 113, respectively. However, in case of displaying other graphic symbols, information required to specify the shapes of the graphic symbols may be stored. In the number field 114, the numbers of taps that should be given to graphic symbols are stored. In the remaining number field 115, the remaining number of times of taps that should be given to graphic symbols is stored. If the player taps a graphic symbol, the remaining number of times in the remaining number field 115 is decremented by one for each tap.

Figure 6:
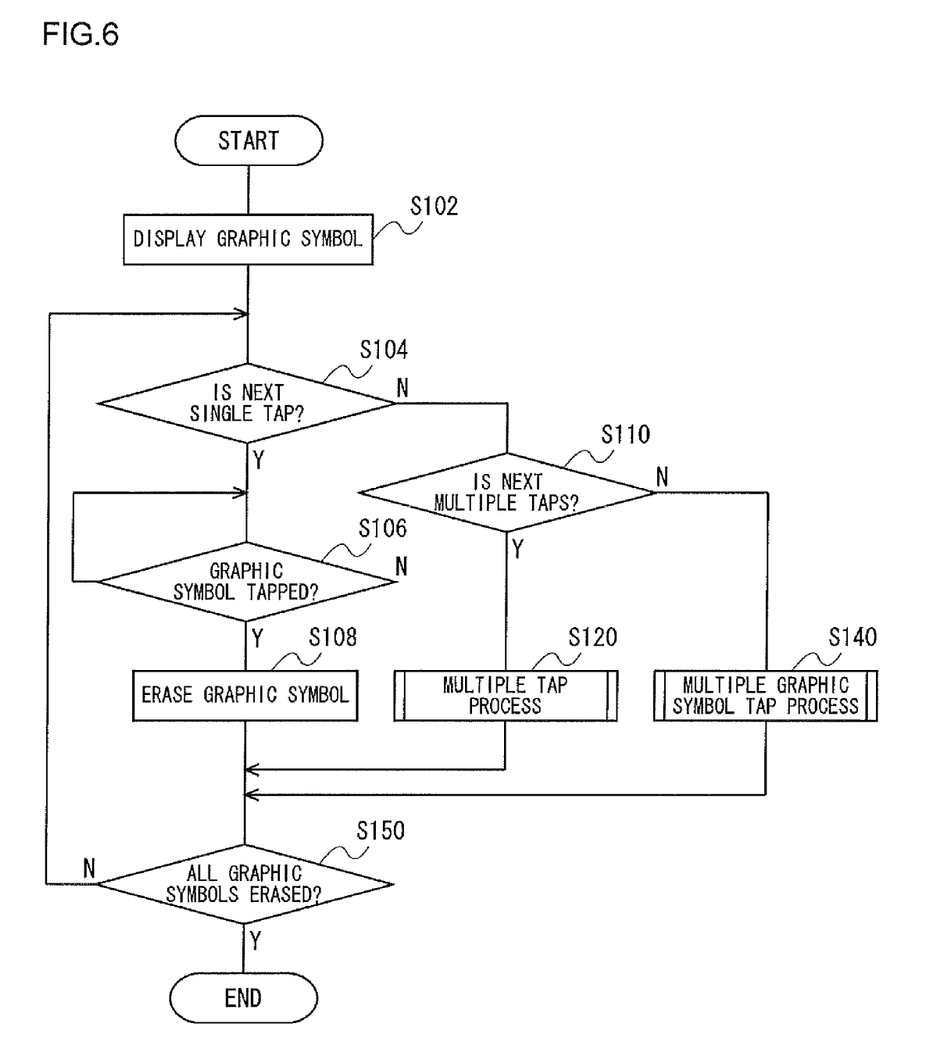
FIG. 6 shows a flowchart indicating a procedure of a first game.

FIG. 6 shows a flowchart indicating a procedure of the first game. If the first game is started, the first game control unit 51 refers to the first game data retaining unit 60 and displays a plurality of graphic symbols, which the player should tap, on a screen image (S102). If a graphic symbol that the player should tap next is a graphic symbol to be tapped once (Y in S104), the single tap input control unit 52 waits until the player taps inside of the graphic symbol (N in S106). Upon acquiring from the input position acquiring unit 41 information indicating that the touch panel 69 is tapped at a position inside of the graphic symbol (Y in S106), the single tap input control unit 52 erases the graphic symbol from the screen image, and changes a corresponding remaining number field 115 of the first game data retaining unit 60 to "0" (S108). The first game control unit 51 refers to the first game data retaining unit 60 and if all of the graphic symbols are erased from the screen image and the remaining number fields 115 of all records are zero (Y in S150), the first game control unit 51 completes the first game. If a graphic symbol to be tapped still remains (N in S150), the procedure returns to step S104.

If a graphic symbol on which the player should tap next is not a graphic symbol to be tapped once (N in S104), but is a graphic symbol to be tapped a plurality of times for a single graphic symbol (Y in S110), the multiple tap input control unit 53 executes a multiple tap process (S120). The detail of the multiple tap process will be described later with reference to FIG. 7. Upon completing the multiple tap process, the procedure moves to step S150, and if all of the graphic symbols have been erased (Y in S150), the first game control unit 51 completes the first game. If a graphic symbol to be tapped still remains (N in S150), the procedure returns to step S104.

If a graphic symbol on which the player should tap next is not a graphic symbol to be tapped once (N in S104), nor a graphic symbol to be tapped a plurality of times (N in S110), a graphic symbol to be tapped next will be a plurality of graphic symbols to be tapped concurrently. Therefore, the multiple-graphic-symbol-tap input control unit 54 executes a multiple graphic symbol tap process (S140). The detail of the multiple graphic symbol tap process will be described later with reference to FIG. 8. Upon completing the multiple graphic symbol tap process, the procedure moves to step S150, and if all of the graphic symbols have been erased (Y in S150), the first game control unit 51 completes the first game. If a graphic symbol to be tapped still remains (N in S150), the procedure returns to step S104.

Figure 7:
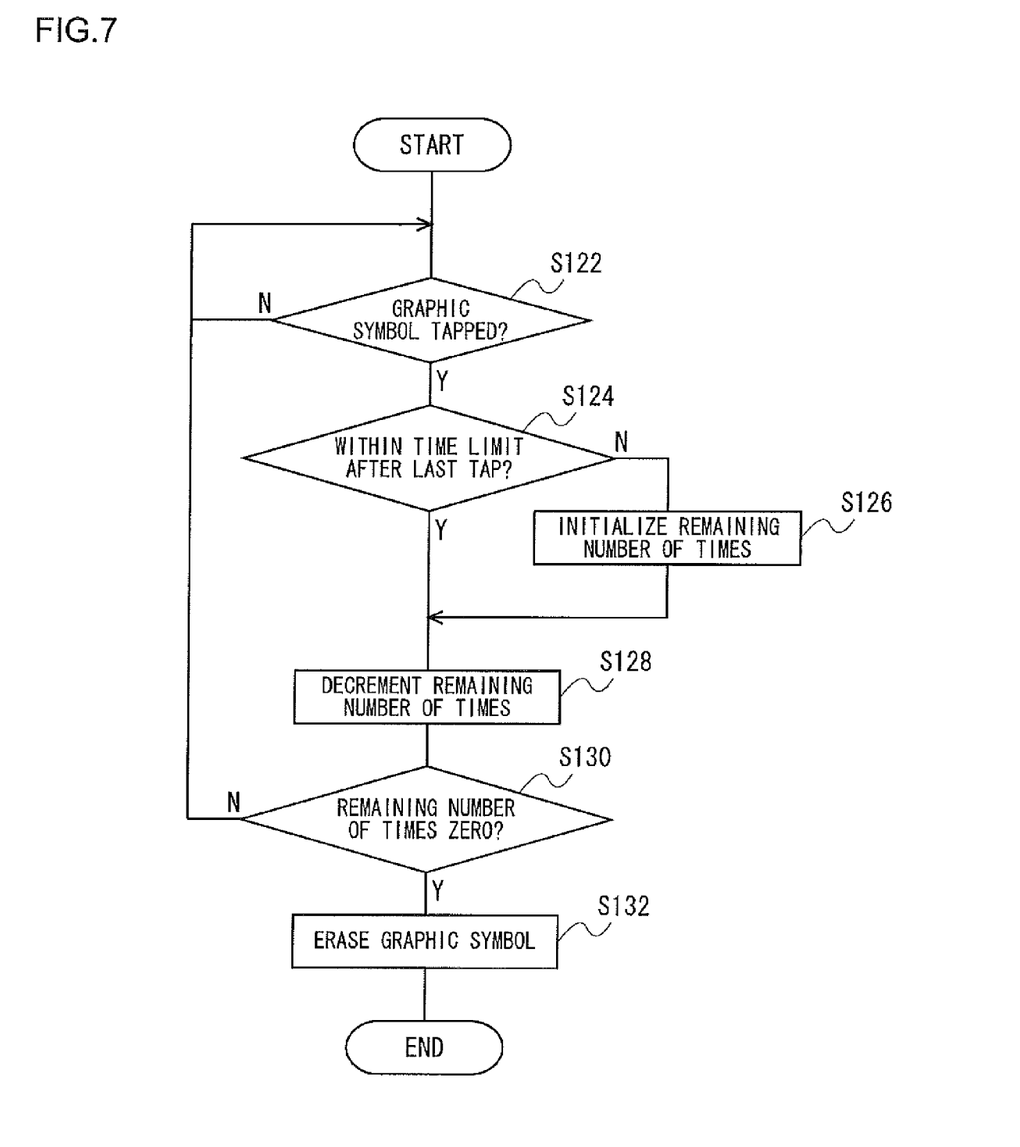
FIG. 7 shows a flowchart indicating a multiple tap process of FIG. 6 in detail.

FIG. 7 shows a flowchart indicating a multiple tap process S120 of FIG. 6 in detail. The multiple tap input control unit 53 waits until the player taps on a graphic symbol to be tapped next (N in S122). Upon acquiring from the input position acquiring unit 41 information indicating that the touch panel 69 is tapped at a position inside of the graphic symbol (Y in S122), the multiple tap input control unit 53 determines whether or not a predetermined time limit has been passed after the last tap on the graphic symbol (S124). This time limit is a parameter used to determine whether or not a plurality of taps is recognized as a sequence of taps, that is, double taps, triple taps, or the like. If the time limit has been passed (N in S124), the multiple tap input control unit 53 temporarily restores the number stored in the number field 114 to the remaining number field 115 of the first game data retaining unit 60 (S126), and decrements the remaining number of times by one (S128). If it is within the time limit (Y in S124), the multiple tap input control unit 53 does not initialize the remaining number of times, and decrements the remaining number of times by one (S128). If the remaining number of times is zero, that is, if the number of sequential taps on a same graphic symbol reaches to a predetermined number of times which the graphic symbol should be tapped (Y in S130), the multiple tap input control unit 53 erases the graphic symbol from the screen image and completes the multiple tap process (S132). If the remaining number of times is not zero (N in S130), the procedure returns to step S122 and the multiple tap input control unit 53 waits until a further tap input onto the graphic symbol is received.

Figure 8:
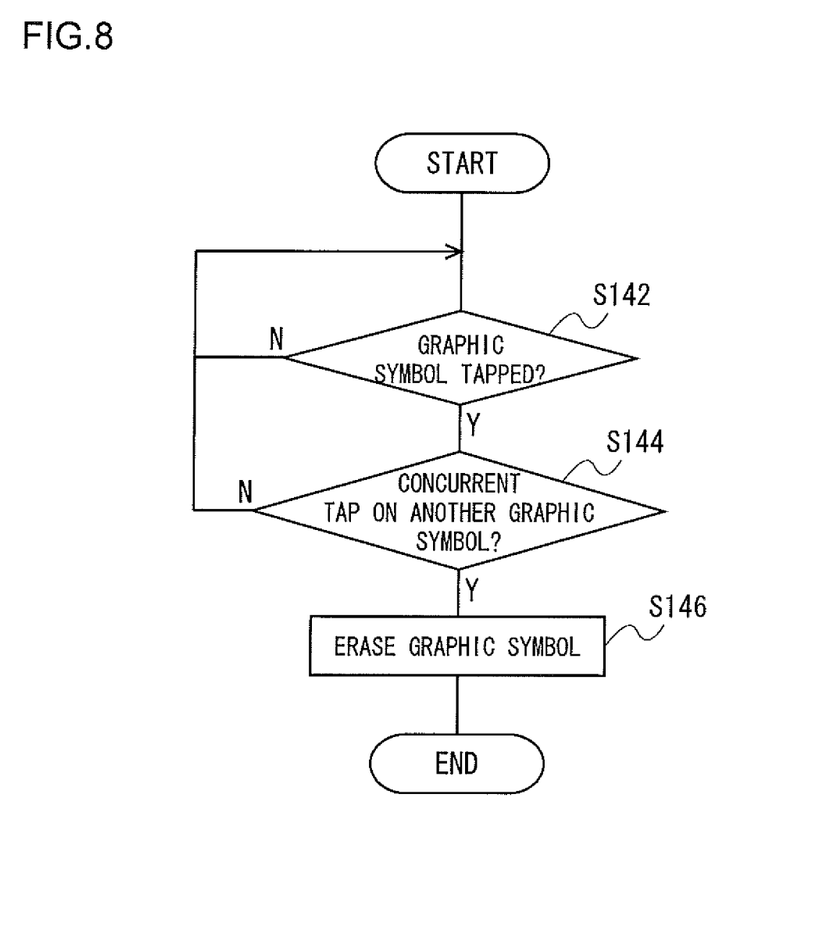
FIG. 8 shows a flowchart indicating a multiple graphic symbol tap process of FIG. 6 in detail.

FIG. 8 shows a flowchart indicating a multiple graphic symbol tap process S140 in FIG. 6 in detail. The multiple-graphic-symbol-tap input control unit 54 waits until the player taps on a graphic symbol to be tapped next (N in S142). Upon acquiring from the input position acquiring unit 41 information indicating that the touch panel 69 is tapped at a position inside of the graphic symbol (Y in S142), the multiple-graphic-symbol-tap input control unit 54 determines whether or not inside positions of all graphic symbols to be tapped concurrently with the graphic symbol has also been tapped (S144). If all of the graphic symbols at its turn is tapped concurrently (Y in S124), the multiple-graphic-symbol-tap input control unit 54 erases all of those graphics symbols from the image screen, changes the remaining number fields 115 of corresponding records of the first game data retaining unit 60 to "0", and completes the multiple graphic symbol tap process (S132). The multiple-graphic-symbol-tap input control unit 54 may determine that all of the graphic symbols have been tapped concurrently if a time period during which all of the graphic symbols are tapped is equal to or more than a predetermined time period, even if time points when taps on respective graphic symbols started are different. If all of the graphic symbols are not tapped concurrently (N in S124), the procedure returns to step S122, and the multiple-graphic-symbol-tap input control unit 54 waits until the player taps the graphic symbols.

According to such a technology, a game can be provided that allows players to improve skills for tap inputs, such as a single tap, double taps, triple taps, multiple point taps, or the like.

The second game control unit 56 controls the second game for allowing a player to experience tap inputs onto the rear touch panel 70. The second game is a game where a tap input on the rear touch panel 70 causes a water droplet to splash from a water surface displayed on a screen image and a player erases a plurality of graphic symbols displayed on a display device in order of instruction by allowing the splashed droplets to contact the graphic symbols. A graphic symbol to be displayed on the screen image may be in any shapes, and may be an image of a rendered three-dimensional object, or the like.

Figure 9:
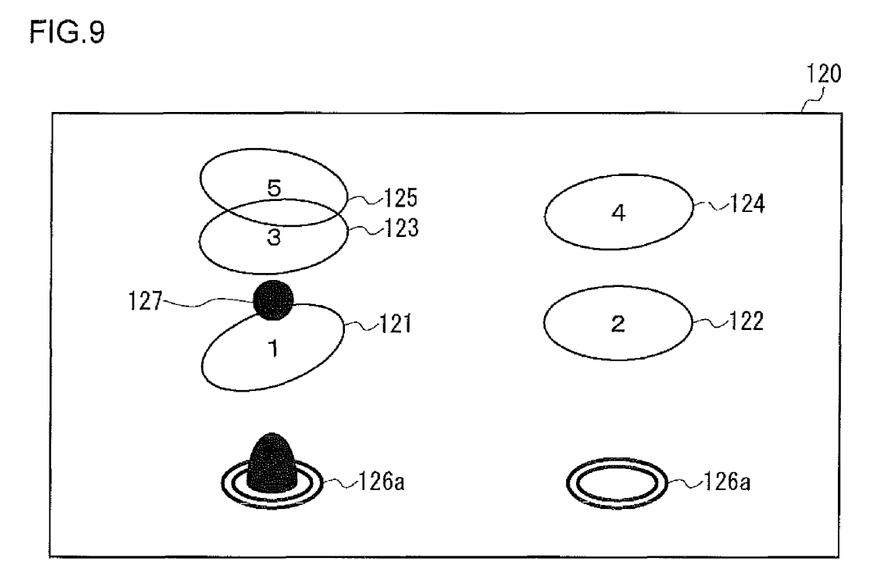
FIG. 9 shows an exemplary game screen image of a second game.

FIG. 9 shows an exemplary game screen image of the second game. A plurality of graphic symbols 121-125 to be erased by water droplets are displayed on a screen image 120. A player taps on the left half area of the rear touch panel 70 (right side of the rear touch panel 70 when viewed from the backside) so as to splash a water droplet 127 from a left side water surface 126a, and taps on the right half area of the rear touch panel 70 so as to splash a water droplet 127 from a right side water surface 126b. The player makes the splashed water droplet 127 to contact a graphic symbol and erases the graphic symbols in order of the number indicated on the graphic symbols 121-125. The graphic symbols 121-125 are divided and arranged into two groups, i.e, a movement pathway of a water droplet splashed from the left side water surface 126*a*, and a movement pathway of a water droplet splashed from the right side water surface 126*b*. The water droplet 127 is splashed to a height determined in accordance with the strength of a tap input onto the rear touch panel 70. If the water droplet 127 contacts a graphic symbol to be erased next, the graphic symbol is erased and the water droplet can pass through the graphic symbol. However, if the water droplet 127 contacts a graphic symbol whose turn is not next, the water droplet collides with the graphic symbol and is bounced back. The player competes for time from the start of the game until all of the graphic symbols are erased.

Figure 10:
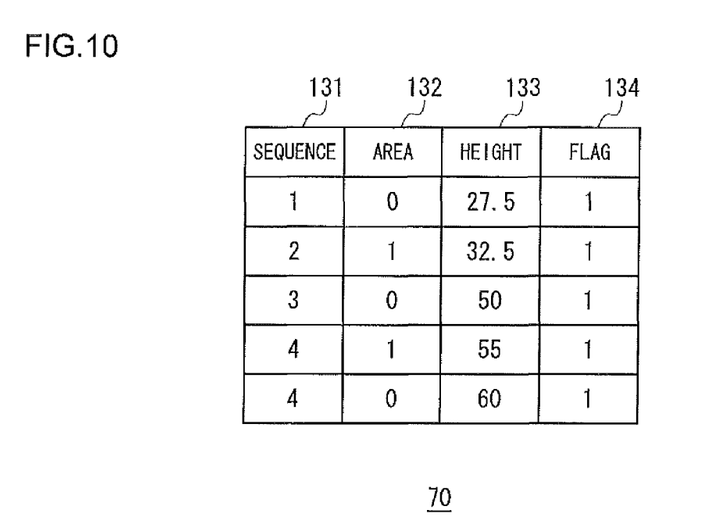
FIG. 10 shows an example of data stored in a second game data retaining unit.

FIG. 10 shows an example of data stored in the second game data retaining unit. In the second game data retaining unit 62, a sequence field 131, an area field 132, a height field 133, and a flag field 134 are provided. In the sequence field 131, a sequence in which the graphic symbols should be erased is stored. In the area field 132, an area where a graphic symbol is displayed is stored. According to the exemplary embodiment, graphic symbols are displayed on two areas (i.e. a left side area and a right side area), and "0" indicates the left side area and "1" indicates the right side area. In the height field 133, the height of the position of a graphic symbol from the water surface is stored. According to the exemplary embodiment, since all of the displayed graphic symbols are an ellipse having a same shape, only the height is specified. However, in case of displaying graphic symbols having different shapes, information for specifying the shape of respective graphic symbols may further be stored. In the flag field 134, a flag indicating whether or not the graphic symbol is erased is stored. According to the exemplary embodiment, "1" indicates that the graphic symbol is not erased and "0" indicates that the graphic symbols is erased.

Figure 11:
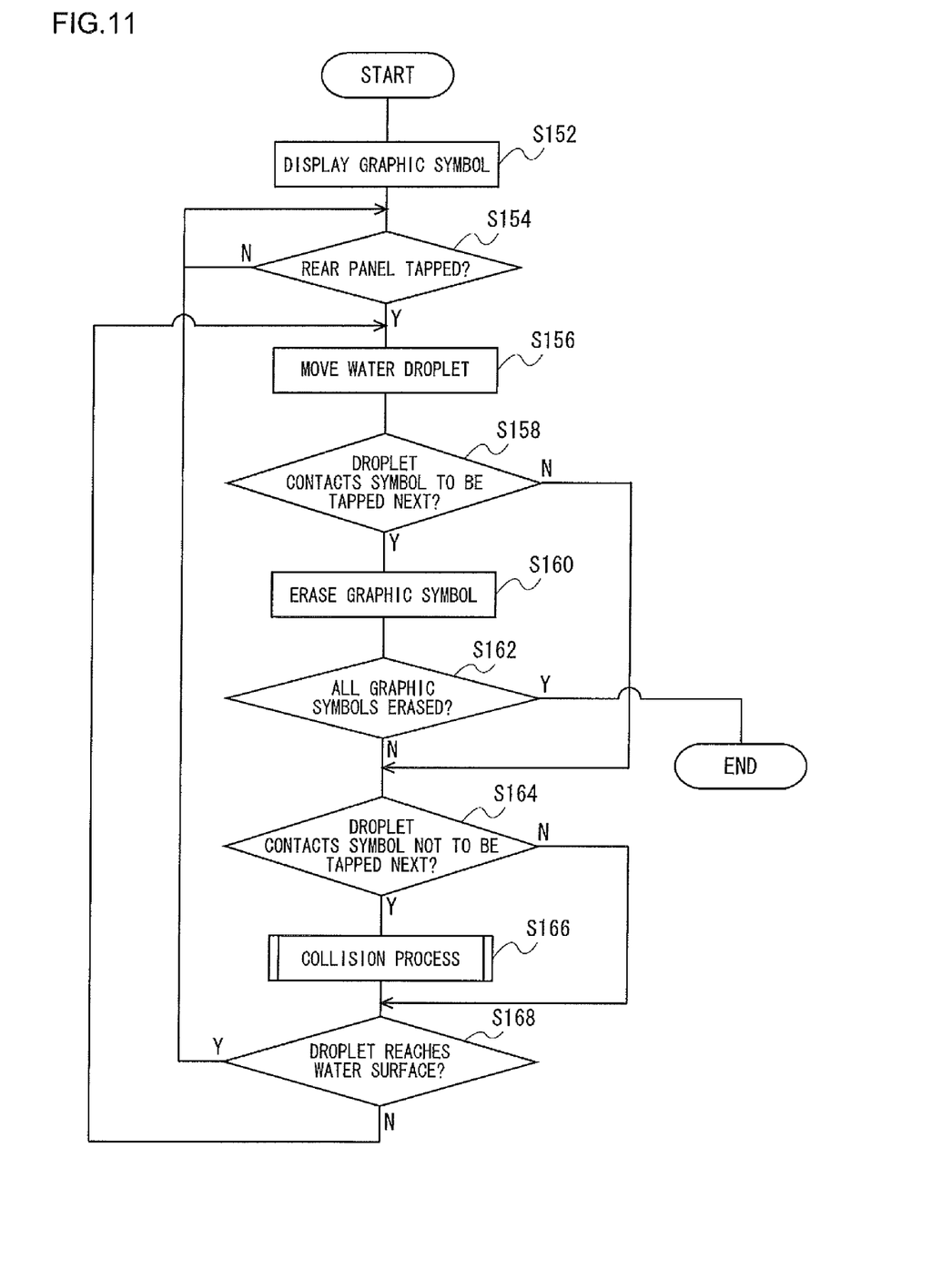
FIG. 11 shows a flowchart indicating a procedure of a second game.

FIG. 11 shows a flowchart indicating a procedure of the second game. If the second game is started, the second game control unit 56 refers to the second game data retaining unit 62 and displays on a screen image a plurality of graphic symbols which the player should erase (S152). The second game control unit 56 waits until the player taps the rear touch panel 70 (N in S154). Upon acquiring from the input processing acquiring unit 41 information indicating that the rear touch panel 70 is tapped (Y in S154), the water droplet movement control unit 57 displays an appearance where a water droplet 127 is splashed from the water surface 126*a* or the water surface 126*b*, which corresponds to an area including a tapped position, and moves the water droplet 127 upward (S156). The water droplet movement control unit 57 acquires from the input strength acquiring unit 42 information indicating the strength of the tap input onto the rear touch panel 70, determines the initial velocity of the water droplet, and moves the water droplet. Thereafter, the water droplet movement control unit 57 controls the movement of the water droplet on the basis of the initial velocity of the water droplet. The water droplet movement control unit 57 may allow the gravitational force to act on the water droplet in the downward direction, and may determine the position of the water droplet by a physical calculation, or may further take into consideration air resistance or the like and may determine the position of the water droplet. Alternatively, the water droplet movement control unit 57 may move the water droplet in a manner different from the actual physical phenomenon. For example, the water droplet movement control unit 57 may calculate the height to which the water droplet is splashed on the basis of the strength of the input, allows the water droplet to move up to the height at a constant velocity, and then allows the water droplet to move downward at a constant velocity, etc.

The graphic symbol erase control unit 58 refers to the second game data retaining unit 62 and determines whether or not the water droplet contact a graphic symbol to be erased next (S158). In case the water droplet contacts the graphic symbol (Y in S158), the graphic symbol erase control unit 58 erases the graphic symbol from the image screen, and changes the flag field 134 of a corresponding record of the second game data retaining unit 62 to "0" (S160). The second game control unit 56 refers to the second game data retaining unit 62, and if the flag field 134 of all records are zero and all of the graphic symbols have been erased from the screen image (Y in S162), the second game control unit 56 completes the second game. If a graphic symbol to be erased still remains (N in S162), the procedure proceeds to S164. In case the water droplet has not been contacted the graphic symbol (N in S158), the steps S160 and S162 are skipped and the procedure proceeds to step S164.

The collision control unit 59 refers to the second game data retaining unit 62 and determines whether or not the water droplet contacts a graphic symbol that should not be erased next (S164). In case that the water droplet contacts the graphic symbol (Y in S164), the collision control unit 59 executes a collision process (S166). The details on the collision process will be described later with reference to FIG. 12. If the collision process is completed, the procedure proceeds to step S168. In case the water droplet has not been contacted the graphic symbol (N in S164), the step S166 will be skipped and the procedure proceeds to step S168.

The water droplet movement control unit 57 determines, after a water droplet is splashed, whether or not the water droplet falls and reaches the water surface (S168). If the water droplet is not back to the water surface (N in S168), the procedure returns to the step S156 and the water droplet movement control unit 57 moves the water droplet (S156). If the water droplet is back to the water surface (Y in S168), the procedure returns to the step S154 and the second game control unit 56 waits until the player taps the rear touch panel 70.

Figure 12:
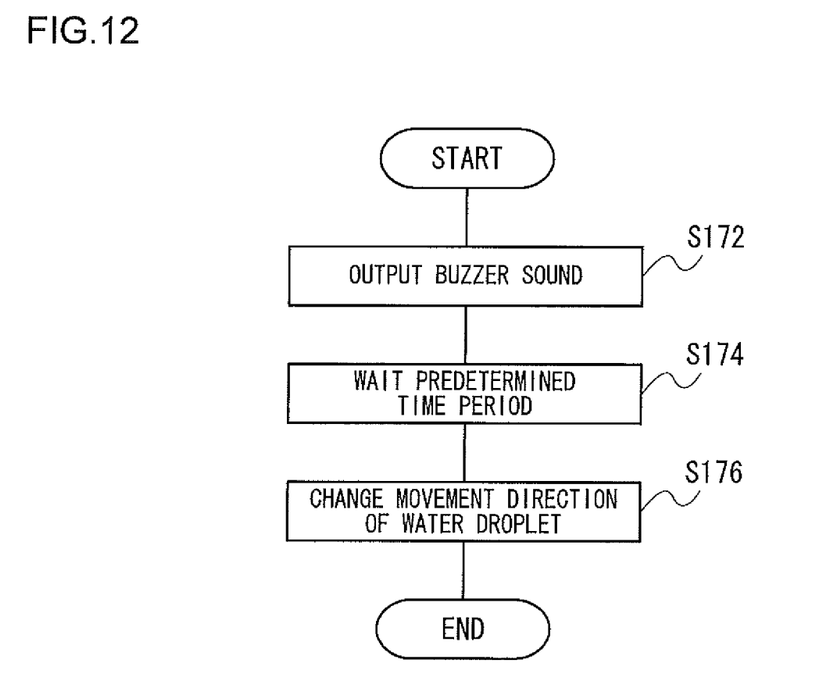
FIG. 12 shows a flowchart indicating a collision process of FIG. 11 in detail.

FIG. 12 shows a flowchart indicating a collision process S166 of FIG. 11 in detail. If a water droplet contacts a graphic symbol that should not be erased next, the collision control unit 59 outputs buzzer sound from a speaker that is now shown (S172), and waits a predetermined time period (S174). This waiting time corresponds to a penalty for allowing water droplets to contact graphic symbols in a wrong order. That is, players are required to adjust the strength of inputs appropriately so as to splash water droplets to appropriate heights in order not to allow water droplets to contact graphic symbols in a wrong order. If a player allows water droplets to contact graphic symbols in a wrong order, it costs extra time and the user cannot leave good results. The collision control unit 59 may define longer waiting time for a larger difference between a height to which the water droplet would reach if the droplet had not contacted a graphic symbol and the height of the position of the graphic symbol. If the waiting time has elapsed, the collision control unit 59 notifies the water droplet movement control unit 57 of an instruction to change the movement direction of the water droplet from upward to downward (S176), and completes the collision process. Thereafter, the water droplet movement control unit 57 allows the water droplet to fall downward.

According to such a technology, a game can be provided that allows players to improve skills for tap inputs onto the rear touch panel 70 while enjoying the game. Further, a game can be provided that allows players to improve skills for adjusting the strength of inputs on the rear touch panel 70.

Given above is an explanation based on the exemplary embodiment. The exemplary embodiment is intended to be illustrative only and it will be obvious to those skilled in the art that various modifications to constituting elements and processes could be developed and that such modifications are also within the scope of the present invention.

Regarding the multiple tap process of the first game, an explanation has been made on an example wherein a graphic symbol is erased on condition that a plurality of taps are input sequentially within a predetermined time limit. However, the time limit may not be defined. In this case, graphic symbols may be erased one by one in accordance with inputs on a plurality of graphic symbols indicated as the same turn. For example, the graphic symbol 103*a* may be erased in accordance with an input onto the graphic symbol 103*a*, and thereafter, the graphic symbol 103*b* may be erased in accordance with an input onto the graphic symbol 103*b*.

Regarding the second game, an explanation has been made on an example wherein a water droplet is splashed upward from a water surface. However, an object that is moved by an input on the rear touch panel may be any object, and the direction of movement and the manner of movement may also be any directions and any manners, respectively. Any objects, and any directions and any manners of a movement with which an object to be moved moves toward an area where a plurality of objects to be erased are displayed, can sufficiently be applied.

What is claimed is:

1. A game control program embedded on a non-transitory computer-readable recording medium, the game control program allowing a computer to function as a game control unit, the game control unit operative to:
    display a plurality of objects and a sequence in which the objects should be erased on a screen image of a display device; and
    erase one or more of the objects from the screen image in a case where an entry is provided by a player on an input device provided on a screen of the display device that concurrently detects player entries at a plurality of points, and where a position of the player entry corresponds to a position where the one or more objects to be erased next is displayed,
    wherein the entry position is determined to correspond to the display position when the entry position is within a displayed shape of the one or more objects to be erased next, and
    wherein the game control unit includes:
        a first control unit that erases one of the one or more objects when an entry for the one of the one or more objects is acknowledged; and
        a second control unit that erases a plurality of the one or more objects when entries for the plurality of the one or more objects are concurrently acknowledged.

2. The game control program according to claim 1, wherein the game control unit further includes a third control unit that erases an object when a plurality of sequential entries for the object are acknowledged.

3. A non-transitory computer-readable recording medium encoded with the program for controlling a game according to claim 1.

4. A game device comprising:
    an acquiring unit operative to acquire a position of an entry provided by a player on an input device, which can concurrently detect entries at a plurality of points; and
    a game control unit operative to display a plurality of objects and a sequence in which the objects should be erased on a screen image of a display device, and, in case that a position of an entry acquired by the acquiring unit is at a position corresponding to a position where one or more of the objects to be erased next is displayed, operative to erase the one or more objects from the screen image,
    wherein the entry position is determined to correspond to the display position when the entry position is within a displayed shape of the one or more objects to be erased next, and
    wherein the game control unit includes:
        a first control unit that erases one of the one or more objects when an entry for the one of the one or more objects is acknowledged; and
        a second control unit that erases a plurality of the one or more objects when entries for the plurality of the one or more objects are concurrently acknowledged.

5. A microprocessor operating under the control of an executable program to implement the steps of a game control method, the method comprising:
    acquiring a position of an entry provided by a player to an input device, which can concurrently detect entries at a plurality of points; and
    displaying a plurality of objects and a sequence in which the objects should be erased on a screen image of a display device, and, in case that a position of an entry acquired is at a position corresponding to a position where one or more of the objects to be erased next is displayed, erasing the one or more objects from the screen image,
    wherein the entry position is determined to correspond to the display position when the entry position is within a displayed shape of the one or more objects to be erased next, and
    wherein the erasing the one or more objects includes:
        erasing one of the one or more objects when an entry for the one of the one or more objects is acknowledged; and
        erasing a plurality of the one or more objects when entries for the plurality of the one or more objects are concurrently acknowledged.

6. A game control program embedded on a non-transitory computer-readable recording medium, allowing a computer to function as a game control unit operative to control a game that displays a plurality of first objects and a sequence in which the first objects should be erased on a screen image of a display device, and erases the plurality of first objects from the screen image,
    wherein the game control unit includes:
        a movement control unit operative to move a second object on the screen image in accordance with a position and a strength of an entry provided by a player on an input device, which is provided on a screen of the display device and which can detect a position and a strength of an entry;
        an erase control unit operative to erase a first object to be erased next if the second object comes in contact with the first object; and
        a collision control unit operative to control the second object so that if the second object comes in contact with a first object that should not be erased next, the second object stops for a predetermined time period without moving or collides with the first object and bounces back.

7. The game control program according to claim 6, wherein the plurality of first object are divided and arranged into a plurality of groups corresponding to a plurality of different movement paths of the second object, and
the movement control unit determines which one of a plurality of second objects should be moved in accordance with the position of the entry.

8. The game control program according to claim 7, wherein the input device is a touch panel provided on the backside of a game device, and
the movement control unit moves the second object so that the second object moves up to a height determined by the strength of the entry and then moves down.

9. The game control program according to claim 8, wherein the collision control unit controls the second object so that if the second object comes into contact with a first object that should not be erased next, the second object stops for a predetermined time period without moving or collides with the first object and bounces back, and
the collision control unit stops the second object without moving for a longer time period for a larger difference between a height to which the second object would reach if the second object had not come into contact with the first object and the height of the position of the first object with which the second object comes into contact.

10. A non-transitory computer-readable recording medium encoded with the program for controlling a game according to claim 6.

11. A game device comprising:
an acquiring unit operative to acquire a position and a strength of an entry provided by a player on an input device, which can detect a position and a strength of an entry; and
a game control unit operative to control a game that displays a plurality of first objects and a sequence in which the first objects should be erased on a screen image of a display device, and erases the plurality of first objects from the screen image,
wherein the game control unit includes:
a movement control unit operative to move a second object on the screen image in accordance with a position and a strength of an entry acquired by the acquiring unit;
an erase control unit operative to erase a first object to be erased next if the second object comes into contact with the first object; and
a collision control unit operative to control the second object so that if the second object comes into contact with a first object that should not be erased next, the second object stops for a predetermined time period without moving or collides with the first object and bounces back.

12. A microprocessor operating under the control of an executable program to implement the steps of a game control method, the method comprising:
acquiring a position and a strength of an entry provided by a player on an input device, which can detect a position and a strength of an entry; and
controlling a game that displays a plurality of first objects and a sequence in which the first objects should be erased on a screen image of a display device, and erases the plurality of first objects from the screen image,
wherein the controlling a game includes:
moving a second object on the screen image in accordance with a position and a strength of an entry acquired by the acquiring;
erasing a first object to be erased next if the second object comes into contact with the first object; and
controlling the second object so that if the second object comes into contact with a first object that should not be erased next, the second object stops for a predetermined time period without moving or collides with the first object and bounces back.

\* \* \* \* \*